Figure 1:
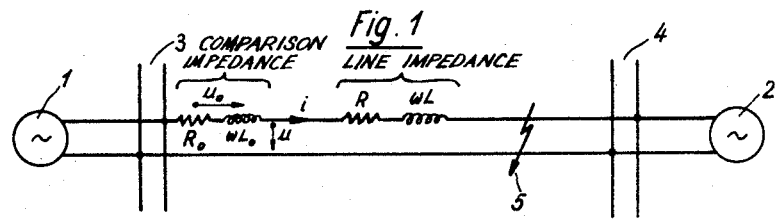

Dec. 29, 1964   L. SEGUIN ETAL   3,163,802
CIRCUIT ARRANGEMENT FOR HIGH SPEED DISTANCE RELAYING
Filed May 9, 1962   4 Sheets-Sheet 1

Inventors.
Lutz Seguin &
Fritz Kesselring.

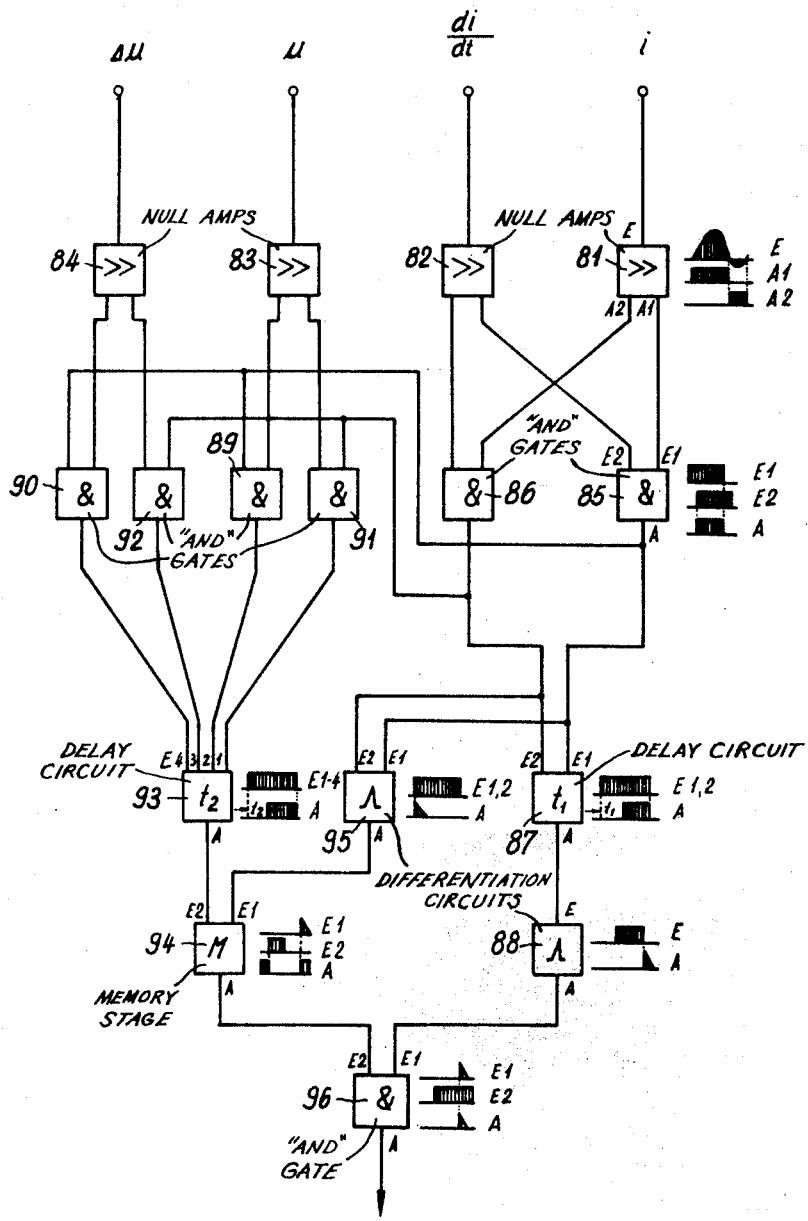

United States Patent Office 3,163,802
Patented Dec. 29, 1964

3,163,802
CIRCUIT ARRANGEMENT FOR HIGH SPEED
DISTANCE RELAYING
Lutz Seguin, Bergdietikon, and Fritz Kesselring, Kusnacht, Zurich, Switzerland, assignors to Siemens & Halske Aktiengesellschaft Berlin and Munich, a corporation of Germany
Filed May 9, 1962, Ser. No. 193,389
Claims priority, application Germany, May 16, 1961, S 73,976
7 Claims. (Cl. 317—36)

The invention disclosed herein is concerned with a high speed distance relaying arrangement for protecting power systems in the case of faults, for example, a short circuit on a line section.

Nearly all presently employed relay systems for protecting power lines contain mechanical systems performing electrical control or measuring operations. Owing to inertia, such systems respond to average values of the current conducted thereto. Increasingly higher requirements are being posed on protection systems and devices so far as the speed of operation and current consumption thereof are concerned, leading toward endeavors to reduce the inertia of the mechanical control members. So far as the principle is concerned, it would be possible to reduce the inertia so as to obtain operative response of the control system in a split cycle of the line current. However, such speed of operation cannot be utilized in connection with any presently known distance relay, since the forces, operating on the mechanical members, particularly when a fault current contains a direct current component, can pulsate respectively with the same or twice the frequency of the current. In order to prevent incorrect operation due to these pulsating forces, the control system must be made to operate with inertia, so great that it responds operatively only to an average value of the force applied. Accordingly, the lower time limit of protection devices operating with mechanical measuring systems can hardly go lower than one cycle.

In order to break through this barrier and to reduce at the same time the load of the measuring transformers by the protective relays, attempts have for a long time been made to construct distance protection devices with the aid of electronic means. These attempts gain increasing importance owing to the rapid progress made in the development of semiconductors.

The basic difference between electronic protective systems and those operating with mechanical control members resides in that the former inherently operate in response to momentary electrical values conducted thereto, while the latter, as explained above, always respond to an average value. This situation explains a few peculiarities which must be observed in connection with an electronic protection, especially the sensitivity with respect to short interference impulses.

The proposals heretofore made, for electronic protective systems, can be subdivided into two groups. The feature which is common to both groups is, that the line voltage $u$ and the voltage $u_0$ at a comparison impedance, which is energized by the line current, must be brought into mutual relationship.

In the case of one group of previously proposed systems, the polarity of the voltage $u$ and the difference $u_0-u$ of the two voltages are compared, and a signal for releasing or executing the required protective operation, is derived from the duration of identical polarities. This is referred to as phase comparison distance relay. The second group of proposals includes systems in which a measurement is effected only within a very short instant of each half wave, which is accurately determined either by the current course or the voltage course, such systems being referred to as momentary or instantaneous value protection.

In each group of systems are in this manner obtained different utilizable operating characteristic in the impedance (R–X) diagram. However, the corresponding systems have disadvantages which until now stood against practical application thereof. Among these disadvantages may be noted the following peculiarities: The mode of operation of the devices was always derived for purely sinusoidal values, especially also for a sinusoidal current which is due to a fault on the line to be protected. However, in the case of rapidly operating devices, which are to operate selectively within the first half wave of a fault-current, there must be considered the direct current component of the fault current. This leads in systems of the first noted group to a considerable broadening of the operating characteristic. Further difficulties are occasioned upon considering the resistance resulting from the possible formation of an arc. Systems in the second group of proposals are extraordinarily sensitive to interference pulses occurring at the instant of measuring. Moreover, the peculiarities of the arc may in such case likewise cause difficulties, especially in a system in which the current is fed from two sides.

The object of the present invention is to provide a new measuring or control system which avoids the disadvantages of the previously known selective electronic protection devices. The invention provides a high speed protective relaying arrangement to which are conducted, for the formation of an operation criterion, the line voltage $u$ and the voltage $u_0$ at the comparison impedance, and in which is formed the difference voltage $\Delta u = u_0 - u$, the characteristic feature of the invention residing in that the polarities of the named voltages, or values derived therefrom, are in each current half wave evaluated only within a time interval $t_0$, during which interval the fault current $i$ and its temporal derivation $di/dt$ have the same sign.

The invention will now be explained more in detail with reference to the accompanying drawings.

Figure 2:
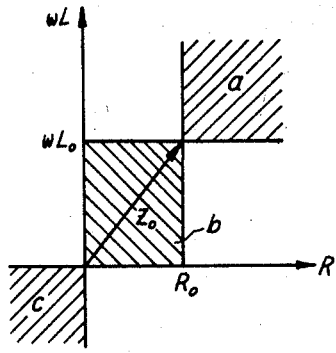
Figure 3:
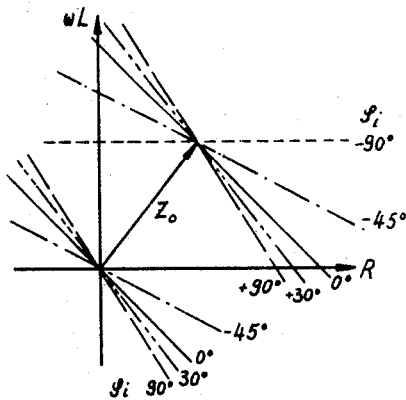
Figure 5:
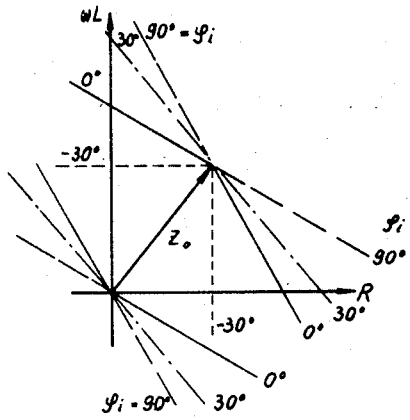
Figure 7:
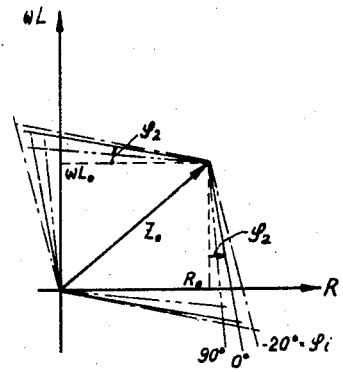
Figure 4:
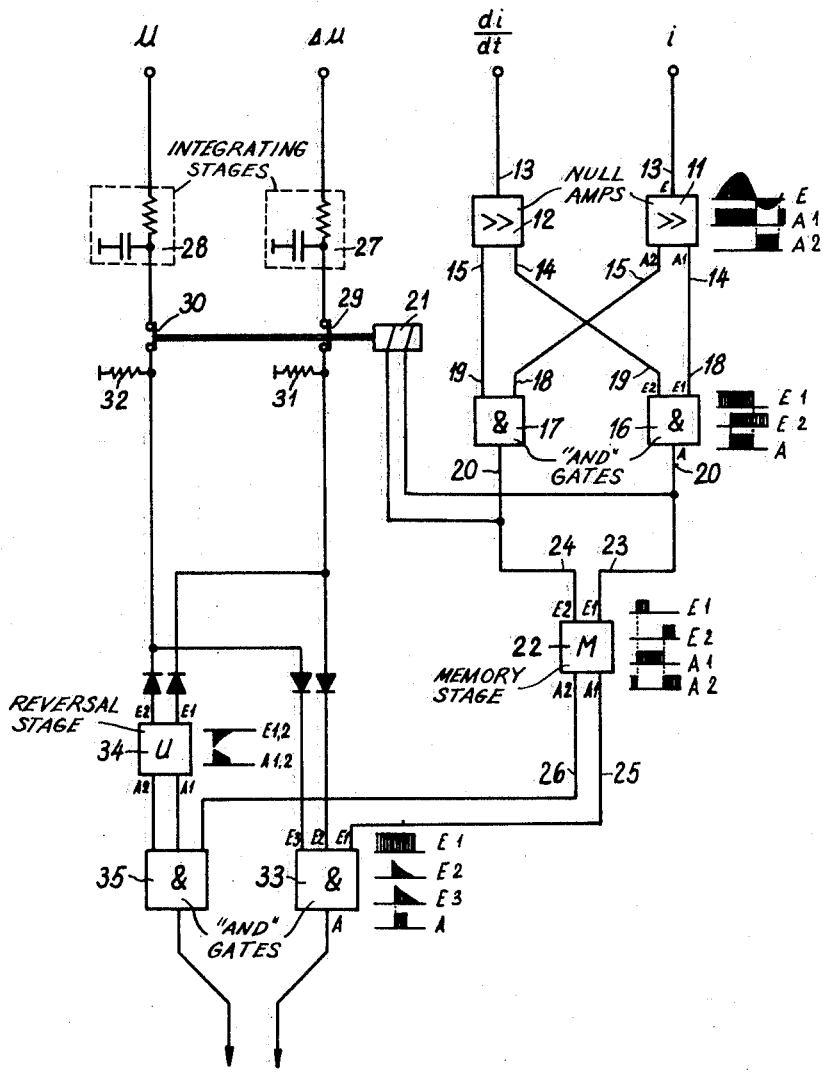
Figure 6:
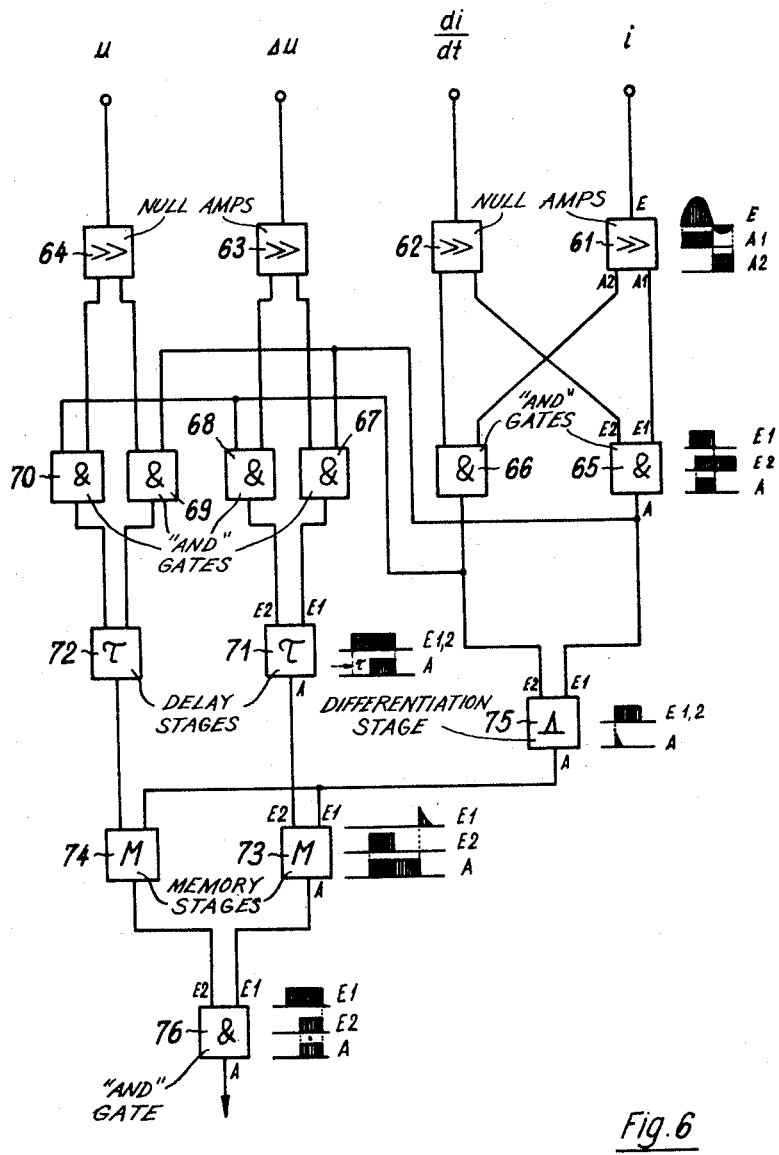

FIG. 1 shows in schematic representation a single-phase line with current supply at both ends thereof;

FIG. 2 taken together with FIG. 1 explains the importance which is attached to limiting the evaluation to a time interval in which $i$ and $di/dt$ have the same sign; and FIGS. 3, 5 and 7 show the operating characteristics resulting in the embodiments which are respectively represented in FIGS. 4, 6 and 8.

The circuits shown in FIGS. 4, 6 and 8 are constructed along the principles of the digital control- and regulation technique. The components which are thereby used are constructed in accordance with relatively simple, generally known basic circuits which are preferably constructed with the aid of transistors and merely provide for "Yes"- "No"-information ("signal" or "no signal").

In FIG. 1, numerals 1 and 2 indicate two power stations while numerals 3 and 4 indicate substations. The following explanations take into consideration the protection provided in the substation 3 which is to protect the line up to the substation 4. It is assumed that a fault 5 occurs along this line section. The resistance of this fault shall be neglected for the general observations to be entered into. The impedance between the location of the fault and the substation 3 is in such situation given by the line impedance comprising the ohmic component R and the inductive component $\omega L$. The fault current $i$ passes through this impedance and produces in the substation 3 the line voltage $u$. The fault current $i$ also flows through a comparison impedance $R_0$, $\omega L_0$, which is normally connected to the secondary side of the current transformers. Upon assuming that the voltage at this comparison impedance amounts to $u_0$, there will be between the momentary or instantaneous values of the voltages $u$ and $u_0$ and the current $i$, the following relations:

$$u = R \cdot i + L \cdot \frac{di}{dt} \quad (1)$$

$$u_0 = R_0 \cdot i + L_0 \cdot \frac{di}{dt} \quad (2)$$

Upon subtracting Equation 1 from the Equation 2, there will be obtained $$\Delta u = (u_0 - u) = (R_0 - R) i + (L_0 - L) \frac{di}{dt} \quad (3)$$

Based upon the Equations 1 and 3, which are entirely independent of the curve form of the fault current, and assuming that $i$ and $di/dt$ have the same sign or, more descriptively expressed, that they are in the region between zero passage and the maximum of the fault current, there may be made the following statements, whereby references to polarity and sign point to the indicia arrows entered in FIG. 1:

(1) For $R > 0$ and $L > 0$, the voltage $u$ must have the same sign as $i$ and $di/dt$ (Equation 1).

(2) For $R < 0$ and $L < 0$, the voltage $u$ must have a sign opposite to that of $i$ and $di/dt$ (Equation 1).

(3) For $R < R_0 (R_0 - R > 0)$ and $L < L_0 (L_0 - L > 0)$, the voltage $\Delta u$ must have the same sign as $i$ and $di/dt$ (Equation 3).

(4) For $R > R_0 (R_0 - R < 0)$ and $L > L_0 (L_0 - L < 0)$, the voltage $\Delta u$ must have a sign opposite to that of $i$ and $di/dt$ (Equation 3).

It is, based upon these statements possible to distinguish in an impedance diagram such as shown in FIG. 2, wherein $Z_0$ ($R_0$, $\omega L_0$) is the comparison impedance, with certainty three regions:

Region $a$: $R > R_0 > 0$ $L > L_0 > 0$. The voltage $u$ always has the same sign as $i$ and $di/dt$, while the voltage $\Delta u$ always has a sign opposite to that of $i$ and $di/dt$.

Region $b$: $R_0 > R > 0$ $L_0 > L > 0$. The voltages $u$ and $\Delta u$ always have the same sign as $i$ and $di/dt$.

Region $c$: $R < 0$ $L < 0$. The voltage $\Delta u$ always has the same sign as $i$ and $di/dt$ and the voltage $u$ always has a sign opposite to that of $i$ and $di/dt$.

It is accordingly possible, by comparison, within the evaluation interval, of the polarity of the two voltages $u$ and $\Delta u$ with that of $i$ and $di/dt$, to delimit three regions in the impedance diagram independent of the curve form of the current. Proper selection of the comparison impedance $Z_0$ as contrasted with the impedance of the line section which is to be protected, will make it possible that the relay arrangement is to operate always in the presence of line impedances in the region $b$ and never to operate in the presence of line impedances in the regions $a$ and $c$.

It is now possible, with observance of the characteristic feature of the invention according to which measurements are effected only when $i$ and $di/dt$ have the same sign, to determine with the aid of the voltages $u$ and $\Delta u$ various operation criteria. Three embodiments will be described below to give examples of the use of such criteria.

Depending upon the accurate determination of the operation criterion, an operation area will be delimited in the impedance diagram, which always contains the region $b$ of FIG. 2 and the borders or limits of which lie in the unhatched region of FIG. 2. However, this delimiting depends more or less upon curve form of the current. In order to take this influence into consideration, there shall be assumed a current course according to the following Equation 4:

$$i = I \cdot (\sin (\omega t - \varphi_1) + \sin \varphi_1) \quad (4)$$

The fault is assumed to appear at the time $t=0$; the transient offset of the fault current is given by the angle $\varphi_1$; the damping of the transient offset component in the fault current shall be neglected. It is moreover for simplification assumed that the evaluation time $t_0$ embraces the entire interval from current zero passage to the current maximum.

As explained previously, the influence of interference pulses must be particularly considered in connection with all electronic protection systems. The safest way to eliminate the detrimental influence of interference pulses resides in integrating the electrical values effected thereby.

Accordingly, in a first example of a high speed protective relaying arrangement embodying the features of the invention, an operation command or signal is given to the involved circuit breaker, when the time integral of the voltage $u$ as well as that of the difference voltage $\Delta u$ have at the end of the evaluation interval $t_0$ the same polarity as the fault current $i$, whereby the duration of integration extends over the entire evaluation time interval $t_0$. Upon fulfilling this operation requirement, the voltage $u$ as well as the difference voltage $\Delta u$ will, during the evaluation interval $t_0$, have preponderantly the same polarity as $i$ and $di/dt$. It can be demonstrated, upon assuming a current course according to Equation 4, that the borders of the operation region become two straight line flights extending respectively through the origin and the end point of the vector $Z_0$, whereby the inclination of the straight lines depends upon the angle $\varphi_1$ and therewith upon the amount of current offset. FIG. 3 shows these straight lines for different angles $\varphi_1$, the respective operation regions always lying between parallel straight lines for the corresponding angle, extending respectively through the points of origin and end of the vector $Z_0$.

FIG. 4 shows an example of an embodiment of the invention. Numerals 11 and 12 indicate null amplifiers, in the regulation art sometimes also referred to as limit value signalling devices, each such device having an input 13 and two outputs 14 and 15. The output 14 supplies a signal when the input 13 has positive polarity, and the output 15 supplies a signal when the input 13 has negative polarity. The null amplifier 11 is energized by a voltage which is proportional to the fault current $i$, and the null amplifier 12 is energized by a voltage which is proportional to the temporal derivation $di/dt$. Both voltages can readily be obtained at the two components $R_0$, $L_0$ of the comparison impedance.

Each output 14 and 15 is extended to an "And" gate indicated respectively at 16 and 17. Each And-gate has two inputs 18, 19 and an output 20, the latter supplying a signal only when both inputs 18, 19 are supplied with a signal. Accordingly, the output of the And-gate 16 carries a signal so long as $i$ and $di/dt$ are positive, and the output of the And-gate 17 carries a signal so long as $i$ and $di/dt$ are negative. The two And-gates 16 and 17 trigger the operation of a relay or switch 21 which is provided with two windings, and also a "memory" stage 22, also marked M for memory, such stage consisting, for example, of a simple bistable flip-flop stage and being provided with two inputs 23, 24 and two outputs 25, 26. The output 25 supplies a signal responsive to a signal extended to the input 23, until a signal is extended to the input 24. From this instant on the output 26 will supply a signal until the input 23 is triggered again.

To the integrating stages 27, 28, each comprising a resistor and a capacitor, are conducted the voltages $u$ and $\Delta u$. So long as the relay 21 is at normal or deenergized, its contacts 29, 30 will be in the illustrated positions, thereby short-circuiting the capacitors by low resistance resistors 31 and 32, allowing integration of the voltages $u$ and $\Delta u$ only during the evaluation time interval $t_0$ in which $i$ and $di/dt$ have the same sign, since the relay 21 is energized only responsive to such condition. At the end of the evaluation time interval, the capacitors of the integrating members will be short circuited again, and at the respective resistors 31 and 32 will appear a voltage impulse with a polarity corresponding to that of the voltage-time-integral of the corresponding voltage. These two impulses, when positive, are conducted to two respective inputs of the And-gate 33 to the third input of which is connected the output 25 of the memory 22 (M). This And-gate 33 delivers at its output a signal only when the two voltage-time integrals from $u$ and $\Delta u$ are at the end of an evaluation interval with positive $i$ and $di/dt$, likewise positive.

In the event that the impulses are negative, they are over a reversal stage 34 (also marked U) changed into positive impulses and conducted to the two inputs of an And-gate 35 having a third input which is connected with the output 26 of the memory 22 (M). This And-gate delivers a signal only when the two voltage-time-integrals of $u$ and $\Delta u$ are at the end of an evaluation interval with negative $i$ and $di/dt$, likewise negative.

The operation requirement according to the invention is accordingly complied with as soon as one of the two And-gates 33 or 35 delivers a signal, and tripping of the involved circuit breaker must take place.

Another embodiment of a high speed distance protection may be constructed based upon the following operation or tripping requirements:

A tripping or operation shall be effected when the voltage $u$ as well as the voltage $\Delta u$ have, within an evaluation interval $t_0$, in which $i$ and $di/dt$ have identical signs, the same sign as $i$ and $di/dt$ at least during a predetermined coincidence time $t_k$.

Based upon a curve form of the current according to Equation 4, there may be derived, for the above stated operation requirements, limits or borders for the operation or tripping region in the impedance diagram, as shown in FIG. 5 for $\varphi_k = \omega t_k = 60°$. Straight line flights intersecting respectively the point of origin and end of the vector $Z_0$ are again shown in this figure, these flights however exhibiting bends at these two points. The operation region lies again between the straight lines extending through the origin and those extending through the point $(R_0, \omega L_0)$.

FIG. 6 shows a circuit which delivers a tripping command or signal responsive to compliance with the operation requirements according to FIG. 5.

The four input voltages which are respectively proportional to $i$, $di/dt$, $u$ and $\Delta u = u_0 - u$, are conducted to four null amplifiers 61, 62, 63 and 64, having functions corresponding to those of the amplifiers 11 and 12 shown in FIG. 4. The outputs of the amplifiers 61 and 62 are, as the outputs of the amplifiers 11 and 12 in FIG. 4, connected to And-gates, in the present case And-gates 65 and 66, so that the output of the And-gate 65 will deliver a signal so long as $i$ and also $di/dt$ are positive, while the output of the And-gate 66 will deliver a signal when these two values are negative. Accordingly, the signals of these two And-gates again determine the evaluation times separately according to the polarities of $i$ and $di/dt$.

The outputs of the two amplifiers 63, 64 and those of the And-gates 65, 66 are over further And-gates 67, 68, 69, 70 mutually linked, so that the And-gates 67 to 70 deliver a signal at the respective output, in the following cases, namely:

And-gate 67: $i$, $di/dt$ and $\Delta u$ positive;
And-gate 68: $i$, $di/dt$ and $\Delta u$ negative;
And-gate 69: $i$, $di/dt$ and $u$ positive;
And-gate 70: $i$, $di/dt$ and $u$ negative.

The outputs of the And-gates 67, 68 and 69, 70, respectively, are connected with corresponding timing or delay stages 71 and 72, respectively. The output of the respective delay stages delivers a signal when the signal on one of the two inputs persists for an interval exceeding a predetermined duration. Such signal disappears again upon disappearance of the signal of longer duration. Upon making the time constant $\tau$ of the delay stages 71, 72 equal to the coincidence time $t_k$, the two delay stages will deliver a signal when the coincidence time interval of the corresponding voltage $u$ or $\Delta u$ is, during an evaluation interval, greater than the predetermined coincidence time $t_k$. The output signals of the two delay stages do not normally appear simultaneously and therefore must be stored in memory stages 73 and 74, respectively, since a tripping operation must be effected only when both voltages $u$ and $\Delta u$ reach the predetermined coincidence time $t_k$ during the evaluation interval. These memory stages 73, 74 are so designed that they deliver an output signal as soon as the inputs are triggered which are connected to the delay stages. The output signal disappears only when the other input of the memory stage receives a signal. This cancellation or extinguishing signal is supplied by a differentiating stage 75 always at the start of a new evaluation period, so that the memory stages begin each new evaluation period without an output signal.

The outputs of the two memory stages are connected to the And-gate 76. This And-gate issues the tripping command or signal responsive to an output signal at both memory stages 73, 74, that is, when both voltages $u$ and $\Delta u$ had, during the preceding evaluation time $t_0$, the same sign as $i$ and $di/dt$ for a longer interval than the predetermined coincidence time $t_k$.

FIGS. 3 and 5 show that the release regions of the described protection systems cannot yet be fully well adapted to the requirements of an impedence distance protection. Moreover, they have the peculiarity that there appears at offset fault current an alternation of the tripping region, resulting especially in the embodiment according to FIGS. 5 and 6, in a considerable extension or widening of the operation region. The reason resides in that the specified operation requirement can be easier complied with in the case of half waves longer than 180°.

A futher improvement of the electronic distance protection can be effected in accordance with the following basic thoughts of the present invention:

While the protective systems known until now operated so that a tripping command or signal was issued only upon compliance with a predetermined operation requirement, the example of an embodiment of a distance protection to be now described operates so that a tripping command is issued at the end of each evaluation period, such command being, however, blocked upon compliance with a predetermined blocking requirement. Likewise the tripping requirement was easier complied with in the case of current half waves greater than 180°, now it applies with respect to the blocking requirement. The region or range in which the blocking requirement appears is then likewise extended, with the feature, however, that the tripping region is reduced at current waves greater than 180°.

There is, however, the danger that a necessary blocking requirement is suppressed at current half waves smaller than 180°. In order to overcome this drawback, there is specified a given length of the evaluation time, before the release signal can be given, thereby excluding the harmful short current half waves.

The corresponding example of an embodiment of a high speed distance protection system according to the present invention therefore operates in accordance with the following principle:

At the end of each evaluation period which is given by the time $t_0$, during which $i$ and $di/dt$ have the same sign, that is, at the current maximum, is delivered a tripping signal, when this evaluation period exceeds a predetermined time $t_1$ ($t_0 > t_1$). The tripping signal is further blocked only when either the line voltage $u$ or the difference voltage $\Delta u = u_0 - u$ had, at some point of the same evaluation period, another sign that $i$ and $di/dt$ for an interval longer than a predetermined time $t_2$.

FIG. 7 shows the borders or limits of the tripping region of such a protective system according to the current course explained with reference to Equation 4. The times $t_1$ and $t_2$ are thereby so selected that, with $\omega$ as the circuit frequency of the electrical network magnitudes, $\varphi_1 = \omega t_1 = 70°$ and $\varphi_2 = \omega t_2 = 10°$. The vector of the comparison impedance is again represented by $Z_0$ ($R_0$, $\omega L_0$). It will be seen that the tripping region embraces very closely a rectangle with the comparison impedance as a diagonal (corresponding to the region $b$ in FIG. 2). The scattering for various values of the angle $\omega_i$ is particularly for the important horizontal delimiting noticeably small. Angles $\varphi_1 < (\varphi_1 - 90°)$ need not be considered since the evaluation time $t_0$ is in such cases shorter than the specified time $t_1$.

The inclination of the horizontal delimitation with respect to the horizontal is in first approximation given by the angle $\varphi_2$. The shorter the time $t_2$ is made, the better will the tripping region be matched to the rectangle and the smaller will be the changes of the tripping region in the case of offset currents. The rectangle as an operation region exactly obtained for $t_2 = 0$. However, such a protection arrangement would have the drawback that any short interference pulse occurring during the evaluation period could result in blocking the tripping operation. It is therefore advantageous to select $t_2$ as small as possible and yet, always large enough so that interference pulses of normal duration do not adversely affect the operation of the protective system. A reasonable range of values is, for example, 0.2 ms. $< t_2 <$ 0.6 ms.

It is thereby possible to determine a closely delimited practically rectangular shaped tripping region in the impedance diagram, which is hardly affected by offset currents. The requirements of the protective relaying technique are particularly well satisfied when the inductance of the comparison impedance is made about equal to 85 percent of the inductance of the line section to be protected and considering in the ohmic resistance of the comparison impedance the resistance of the line section to be protected, including the highest arc resistance that may be expected.

FIG. 8 shows as an example an embodiment of a high speed distance protective relaying system operating in accordance with the above noted requirements. The four input voltages which are respectively proportional to $i$, $di/dt$, $u$ and $\Delta u = u_0 - u$ are again conducted to null amplifiers 81, 82, 83, 84 corresponding to the null amplifiers described in connection with FIGS. 4 and 6. The And-gates 85, 86, connected with the null amplifiers 81, 82, deliver and signal when both $i$ and $di/dt$ are respectively positive or negative. The time delay circuit 87, serially connected with respect to the And-gates 85, 86, ascertains whether the evaluation period $t_0$ is greater than the predetermined time $t_1$ and then delivers an output signal up to the end of the evaluation period. The differentiating circuit 88 produces an impulse at its output upon disappearance of its input signal, that is, at the end of the evaluation period and therewith at the current maximum.

The And-gates 89, 90, 91, 92 check the polarities of the voltages $u$ and $\Delta u$ during the evaluation period. A signal is thereby produced by the And-gates as follows:

By 89, when $i > 0$, $di/dt > 0$ and $u < 0$;
By 90, when $i > 0$, $di/dt > 0$ and $\Delta u < 0$;
By 91, when $i < 0$, $di/dt < 0$ and $u > 0$;
By 92, when $i < 0$, $di/dt < 0$ and $\Delta u > 0$.

The time delay circuit 93, having four Or-inputs to which are connected these And-gates, now checks whether one of the blocking signals delivered by one of the And-gates has a duration exceeding the predetermined time $t_2$, thereby excluding brief interference pulses. As soon as this time $t_2$ is exceeded by a blocking signal, the memory stage 94 will be triggered. This memory stage 94 is circuited so that the signal at its output disappears when the memory stage is triggered from the time delay circuit 93. The signal at its output reappears only when a signal is conducted to the other input of the memory stage 94. This signal is at the start of each evaluation period produced by the differentiating circuit 95, thereby effecting at the start of each new evaluation period cancellation or extinguishing of a blocking command that may be present from the preceding evaluation period.

The outputs of the differentiating circuit 88 and of the memory stage 94 are conducted to the And-gate 96. This And-gate passes the tripping signal produced by the differentiating circuit 88 only when there is a signal also at its other input. However, this is the case only when no blocking condition had been satisfied in the preceding evaluation period, and the tripping impulse is produced only when the evaluation time $t_0$ is longer than $t_1$. A high speed distance relaying system according to the circuit shown in FIG. 8 thus operates exactly according to the requirements of the operation region shown in FIG. 7.

It is thus possible to construct in accordance with the invention a high speed distance relaying circuit arrangement which has in the RX-diagram an ideal tripping region for distance relaying purposes, which is insensitive to short interference pulses, designed only with static components, and which in the case of a fault transmits the tripping impulse to the involved circuit breaker already in the maximum of the first fully developed half wave of the fault current.

The application of the circuit described for a single-phase line, to a three-phase line system is readily accomplished by utilizing in known manner in the place of the line voltage the voltage between two phases or delta voltages and in place of the current the difference of the two phase currents or delta currents.

Changes may be made within the scope and spirit of the appended claims which define what is believed to be new and desired to have protected by Letters Patent.

We claim:

1. For use in protecting power systems in the event of trouble arising along a line section, a distance relaying circuit arrangement cooperatively associated with a line section to be protected, said circuit arrangement responding quickly to a fault arising along the respective line section for the purpose of forming a criterion for the operative tripping of a power control device; means for conducting to said circuit arrangement the voltage ($u$) at the line section and the voltage ($u_0$) at a comparison impedance; means for forming the difference voltage ($\Delta u = u_0 - u$), and means for evaluating in each current half wave the polarities of said voltages or values derived therefrom only during a time interval in which the fault current ($i$) and its temporal derivation ($di/dt$) have the identical sign.

2. A circuit arrangement according to claim 1, wherein a tripping signal is delivered when the time integral of the voltage ($u$) as well as the time integral of the difference voltage ($\Delta u$) have at the end of the evaluation interval ($t_0$) the same polarity as the fault current ($i$).

3. A circuit arrangement according to claim 1, wherein a tripping signal is delivered when the voltage ($u$) at the line section as well as the difference voltage ($\Delta u$) have, during the evaluation interval, for a predetermined time ($t_k$) the same polarity as the fault current ($i$).

4. A circuit arrangement according to claim 1, wherein the delivery of the tripping signal, at the end of the evaluation interval ($t_0$), is omitted only when either or both the voltage ($u$) or the difference voltage ($\Delta u$) have at some point of the evaluation interval ($t_0$) a sign differing from that of the fault current ($i$).

5. A circuit arrangement according to claim 4, wherein the delivery of a tripping signal is omitted only when either or both the voltage ($u$) at the line section or the difference voltage ($\Delta u$) have at some point of the evaluation interval at least for a predetermined time a sign differing from that of the fault current ($i$).

6. A circuit arrangement according to claim 4, wherein the evaluation interval ($t_0$) embraces the entire time interval during which the loop current ($i$) and its temporal derivation ($di/dt$) have identical signs.

7. A circuit arrangement according to claim 4, wherein the tripping signal is delivered only when the evaluation interval ($t_0$) is greater than a predetermined time interval ($t_1$) which corresponds at least to ⅛ cycle referred to the network frequency.

No references cited.